United States Patent Office 3,538,140
Patented Nov. 3, 1970

3,538,140
PREPARATION OF NITRILES
Heinrich Goldschmid, Brig, and Theodul Pfammatter, Visp, Switzerland, assignors to Lonza Ltd., Gampel, Valais, Switzerland
No Drawing. Filed Mar. 18, 1968, Ser. No. 714,083
Claims priority, application Switzerland, Mar. 21, 1967, 4,015/67
Int. Cl. C07c 121/12, 121/22, 121/52
U.S. Cl. 260—465                                  6 Claims

ABSTRACT OF THE DISCLOSURE

Nitriles are prepared by reacting, in the absence of any solvent, an amide with a phosphoric dehydrating agent in the presence of an alkali metal salt and a catalytic amount of an organic nitrogen base.

The invention relates to the preparation of nitriles from amides. In Pat. No. 3,317,585, belonging to the assignee of this application, a preparation process has been disclosed in which amides dissolved in an inert organic solvent are heated at a temperature of 50 to 100° C. with the pentoxide, pentachloride, or oxychloride of phosphorus as dehydrating agent in the presence of a catalytic amount of an organic nitrogen base and $AlCl_3$ or $AlCl_3 \cdot NaCl$.

In further development of said process, we have now found that it is possible to operate without any solvent when, instead of aluminium chloride or its double salt with sodium chloride, only an alkali metal salt in an amount of 1 to 50, preferably 5 to 15 percent by weight of the amide, is used.

Our process avoids the considerable expenses and losses inherent in the recovery and regeneration of the solvent and produces of 94 to 95% of crude nitrile from which a pure product can be obtained by vacuum distillation in a yield of 90 to 92%. In the past, several proposals have been made to prepare nitriles from amides, particularly malononitrile from cyanoacetamide, in a non-solvent system. However, in all such methods, the yields obtained were, at best, only in the range of about 70 percent.

The organic nitrogen bases employed as catalyst in the process of the invention can be applied as such or in form of their hydrogen halide compounds. The bases may be primary, secondary, or tertiary aliphatic, aromatic or heterocyclic amines, which may be used in amounts of 0.1 to 10, preferably 2 to 3 percent by weight of the amide. We prefer to employ dimethylamine, diethylamine, triethylamine, naphthylamine, diphenylamine, pyridine, dimethylformamide, N,N-dimethylaniline, dimethylamine-hydrochloride or ethylaminehydrochloride. Suitable alkali-metal salts are salts of strong inorganic acids such as hydrochloric, sulfuric or phosphoric acid, preferably sodium or potassium chloride, but also disodium or trisodium phosphate may be employed. The preferred dehydrating agent of the phosphorus group is phosphorus pentachloride, but phosphorus pentoxide or oxychloride may also be used. The dehydrating agent is used in a slight excess, preferably in an excess of about 5 to 20 percent of the theoretically required amount.

The reaction is carried out in a temperature range of about 50 to 300° C., preferably 100 to 200° C. and at a pressure of 1 to 700, preferably 10 to 100 mm. Hg.

The invention is illustrated by the following examples but is not limited thereto.

EXAMPLE 1

500 g. of cyanoacetamide, 460 g. of phosphorus pentachloride, 50 g. of sodium chloride, and 15 g. of diethylamine were placed in a 1.5 liter glass flask which was equipped with a strong stirrer and connected to an effective vacuum. The flask was heated on a bath; HCl development started at about 125° C. and became successively stronger. By proper adjustment of the vacuum, the pressure in the flask was maintained below 100 mm. Hg. When the HCl development decreased, the bath temperature was gradually raised to about 200° C. until the produced malononitrile had been completely distilled off. There were obtained 372 g. of a 95.4% product, corresponding to a yield of 90.3 percent.

EXAMPLE 2

500 g. of cyanoacetamide, 460 g. of phosphorus pentachloride, 50 g. of potassium chloride, and 15 g. of diethylamine were reacted as in Example 1. There were obtained 389 g. of a 95% malononitrile, corresponding to a yield of 94.1%.

EXAMPLE 3

A mixture of 500 g. of cyanoacetamide, 460 g. of phosphorus pentachloride, 50 g. of common salt and 50 g. of diphenylamine were reacted in the manner described in Example 1. There were obtained 396 g. of a distillate consisting of 94.7% malodinitrile, corresponding to a yield of 95.4%.

EXAMPLE 4

According to the procedure of Example 1, 500 g. of cyanoacetamide were reacted with 460 g. of phosphorus pentachloride with addition of 50 g. of potassium chloride and 50 g. naphthylamine. The obtained distillate (368 g.) had a content of 99.5% of malononitrile, corresponding to a yield of 93.3%.

EXAMPLE 5

730 g. of benzamide, 460 g. of phosphorus pentachloride, 50 g. of common salt, and 20 g. of diethylamine were placed into the apparatus of Example 1. The reaction started at about 55° C. At a pressure below 50 mm. Hg, distillation took place until the bath temperature had reached 150° C.

There were obtained 630 g. of a distillate containing 92.1% of benzonitrile, corresponding to a yield of 93.3%.

EXAMPLE 6

As in Example 1, 500 g. of cyanoacetoamide were reacted with 460 g. of phosphorus pentachloride in the presence of 50 g. of disodium phosphate and 50 g. of naphthylamine. There were obtained 372.5 g. of malononitrile of 95% purity, corresponding to a yield of 90%.

We claim:
1. A process of preparing nitriles selected from the group consisting of malononitrile and benzonitrile comprising heating an amide selected from the group consisting of cyanoacetamide and benzamide with a dehydrating agent selected from the group consisting of phosphorous pentoxide, phosphorous pentachloride, and phosphorous oxychloride said dehydrating agent being used in a slight excess, at a temperature of about 50 to 300° C. in the presence of 0.1 to 10 percent of an organic nitrogen base selected from the group consisting of dimethylamine, diethylamine, triethylamine, naphthylamine, diphenylamine, pyridine, dimethylformamide, N,N-dimethylaniline, dimethylaminehydrochloride and ethylaminehydrochloride and 1 to 50 percent of an alkali metal salt of a strong inorganic acid selected from the group consisting of hydrochloric, sulfuric or phosphoric acid, calculated on the weight of the amide, in a solvent free system.

2. The process as claimed in claim 1 wherein said dehydrating agent is phophorus pentachloride.

3. The process as claimed in claim 1 wherein the temperature varies between 100 and 200° C.

4. The process as claimed in claim 1 wherein said amide is cyanoacetamide.

5. The process as claimed in claim 1 wherein said amide is benzamide.

6. The process as claimed in claim 1 wherein said alkali metal salt is a member of the group consisting of sodium and potassium chloride.

References Cited

UNITED STATES PATENTS

| 2,459,128 | 1/1949 | Fahrenbach | 260—465.2 XR |
| 3,317,585 | 5/1967 | Herschmann | 260—465.2 |
| 3,459,783 | 8/1969 | Budnick | 260—465.2 |

JOSEPH P. BRUST, Primary Examiner

U.S. Cl. X.R.

260—465.2